(12) United States Patent
Wang et al.

(10) Patent No.: US 7,832,009 B2
(45) Date of Patent: Nov. 9, 2010

(54) TECHNIQUES FOR PREVENTING ATTACKS ON COMPUTER SYSTEMS AND NETWORKS

(75) Inventors: Sheng-Yih Wang, San Jose, CA (US); Ron Talmor, Cupertino, CA (US)

(73) Assignee: Foundry Networks, LLC, San Jose, CA (US)

( * ) Notice: Subject to any disclaimer, the term of this patent is extended or adjusted under 35 U.S.C. 154(b) by 615 days.

(21) Appl. No.: 11/616,209

(22) Filed: Dec. 26, 2006

(65) Prior Publication Data
US 2009/0300759 A1 Dec. 3, 2009

Related U.S. Application Data

(60) Provisional application No. 60/754,736, filed on Dec. 28, 2005.

(51) Int. Cl.
*G06F 11/00* (2006.01)
(52) U.S. Cl. .................. 726/22; 370/241; 370/252; 370/351; 370/389; 370/400; 370/401; 709/238
(58) Field of Classification Search .......... 370/241, 370/252, 351, 389, 400, 401; 709/238; 726/22
See application file for complete search history.

(56) References Cited

U.S. PATENT DOCUMENTS 7,028,098 B2   4/2006   Mate et al.
7,619,971 B1*  11/2009  Siva et al. .......... 370/230.1
2005/0157647 A1*  7/2005  Sterne et al. .......... 370/235
2007/0022479 A1*  1/2007  Sikdar et al. .......... 726/22

OTHER PUBLICATIONS http://www.cert.org/tech_tips/denial_of_service.html, "CERT® Coordination Center, Denial of Service Attacks," 9 pages, © 1997, 1998 Carnegie Mellon University (printed on Dec. 26, 2006).
http://en.wikipedia.org/wiki/Denial-of-service_attack, "Denial-of-service attack," 7 pages, page last modified 2:57, Jun. 25, 2006 (printed on Jun. 26, 2006).

* cited by examiner

*Primary Examiner*—William Trost, IV
*Assistant Examiner*—Siming Liu
(74) *Attorney, Agent, or Firm*—Townsend and Townsend and Crew LLP

(57) ABSTRACT

Techniques for detecting and responding to attacks on computer and network systems including denial-of-service (DoS) attacks. A packet is classified as potentially being an attack packet if it matches an access control list (ACL) specifying one or more conditions. One or more actions may be performed responsive to packets identified as potential attack packets. These actions may include dropping packets identified as potential attack packets for a period of time, rate limiting a port over which the potential attack packets are received for a period of time, and other actions.

12 Claims, 3 Drawing Sheets

TECHNIQUES FOR PREVENTING ATTACKS ON COMPUTER SYSTEMS AND NETWORKS

CROSS-REFERENCES TO RELATED APPLICATIONS

The present application claims the benefit and priority under 35 U.S.C. 119(e) from U.S. Provisional Application No. 60/754,736, entitled "ATTACK PREVENTION TECHNIQUES" filed Dec. 28, 2005, the entire contents of which are herein incorporated by reference for all purposes.

BACKGROUND OF THE INVENTION

The present invention relates to networking and more particularly to techniques for detecting and responding to attacks on computer systems and networks.

There are numerous ways in which a computer or network system may be attacked to prevent users of the system from using a service provided by the system. Several techniques have been used in the past to prevent such attacks. For example, in a network environment, firewalls may be used that employ access control lists (ACLs) to either deny or permit a packet to enter a protected segment of the network. In a typical ACL system, every packet received is matched against a list of pre-defined filters. When a packet matches a filter, that packet is either permitted or denied entry to the protected network segment based upon the filter. This approach however cannot be used for all types of attacks. For example, the ACL approach described above may be used to prevent unwanted traffic from entering a protected network but cannot be used to detect and respond to anomalies introduced by attacks such as denial-of-service (DoS) attacks.

A DoS attack is an attack on a system that is characterized by an attempt by an attacker to prevent legitimate users of the system from using a service offered by the system. A DoS attack on a system generally causes loss of service of the system to users. Typically, a DoS attack causes loss of service or network connectivity by consuming the bandwidth of the victim network or computer system or overloading the computational resources of the victim system. DoS attacks may take various forms. For example, a DoS attack may attack a system by attempting to consume scarce, limited, or non-renewable resources of the system, by destroying or altering configuration information of the system (e.g., by altering routing information associated with a router), by disrupting physical network components of the victim system, and the like. Examples of DoS attacks include SYN floods, ICMP floods, UDP floods, application level floods, banana attacks, a "pulsing zombie" attack, nukes, and others. For purposes of this invention, a DoS attack includes a distributed DoS attack.

In a DoS attack scenario, the packets that are received cannot be simply dropped (i.e., denied access) or forwarded (i.e., permitted access to a protected segment of the network) using conventional attack prevention systems as described above. This is because usually in DoS attacks, the packets themselves are legal if they are received in small quantities but are illegal if received in very large quantities. Accordingly, simple filters cannot be used to deny or prevent access. As a result, improved techniques are desired for preventing attacks such as DoS attacks.

BRIEF SUMMARY OF THE INVENTION

Embodiments of the present invention provides techniques for detecting and responding to attacks on computer and network systems including detecting and responding to denial-of-service (DoS) attacks. A packet is classified as potentially being an attack packet if it matches an access control list (ACL) specifying one or more conditions. One or more actions may be performed responsive to packets identified as potential attack packets. These actions may include dropping packets identified as potential attack packets for a period of time, rate limiting a port over which the potential attack packets are received for a period of time, and other actions.

According to an embodiment of the present invention, techniques are provided for detecting and responding to an attack on a system. A set of access control lists is stored in a content addressable memory (CAM), each access control list specifying one or more conditions. One or more lookups are performed in the CAM to identify a packet that matches a first access control list from the set of access control lists. Information associated with the first access control list is determined. An action is performed based upon the information associated with the first access control list, wherein the action is performed on one or more packets matching the first access control list.

In one embodiment, the action comprises dropping all packets matching the first access control list for a period of time. The number of dropped packets may be counted. In an alternative embodiment, the action comprises, dropping, for a period of time, any packet received via an input port that matches the first access control list and receipt of the packet causes a rate threshold value to be exceeded.

In one embodiment, the information associated with the first access control list comprises a threshold value and the action comprises dropping, for a period of time, any packet received via an input port that matches the first access control list and receipt of the packet causes the threshold value to be exceeded, wherein the period of time is determined from the information associated with the first access control list. In an alternative embodiment, the action comprises determining if a rate of receipt of packets matching the first access control list exceeds the threshold value, and upon determining that the rate of receipt of packets matching the first access control list exceeds the threshold value, dropping, for a period of time, all packets received via the input port that match the first access control list, wherein the period of time is determined from the information associated with the first access control list.

In one embodiment, the information associated with the first access control list is accessed from a random access memory (RAM) using an index determined from performing a lookup in the CAM. The CAM may be a ternary CAM. The first access control list may specify one or more conditions for detecting a packet involved in a denial-of-service attack.

According to another embodiment of the present invention, techniques are provided in a device comprising an input port, a content addressable memory (CAM), and a random access memory (RAM) for conditioning traffic flow received via the input port. A set of access control lists may be stored in the CAM, each access control list specifying one or more conditions. One or more lookups are performed in the CAM to identify a packet that matches a first access control list from the set of access control lists. Information associated with the first access control list is determined from the RAM. The receipt of packets received via the input port that match the first access control list is conditioned, wherein the conditioning comprises dropping, for a first period of time, all packets received via the input port that match the first access control list or dropping, for a second period of time, any packet received via the input port that matches the first access control list and receipt of the packet causes a rate threshold value to be exceeded. The techniques may be incorporated into a network device such as a switch or router.

According to an embodiment of the present invention, a network switch is provided that is adapted to determine if a rate of receipt of packets matching an access control list exceeds a first threshold value. Upon determining that the rate of receipt of packets matching the access control list exceeds the first threshold value, the network switch drops, for a first period of time, all packets received that match the access control list. The network switch is also adapted to drop, for a second period of time, any packet received that matches the access control list and receipt of the packet causes a second threshold value to be exceeded.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for detecting and responding to attacks on computer and network systems including detecting and responding to denial-of-service (DoS) attacks so as to prevent the attacks. Embodiments of the present invention may be implemented in hardware, software, or combinations thereof. Components of the present invention may be incorporated as standalone systems that are configured to detect and respond to attacks including DoS attacks. Components of the present invention may also be incorporated into one or more system or systems (which may be distributed) enabling the system or systems to detect and respond to attacks including DoS attacks. For example, an embodiment of the present invention may be incorporated into a network device such as a switch or router, thereby enabling the network device to detect and respond to attacks including DoS attacks.

Figure 1:
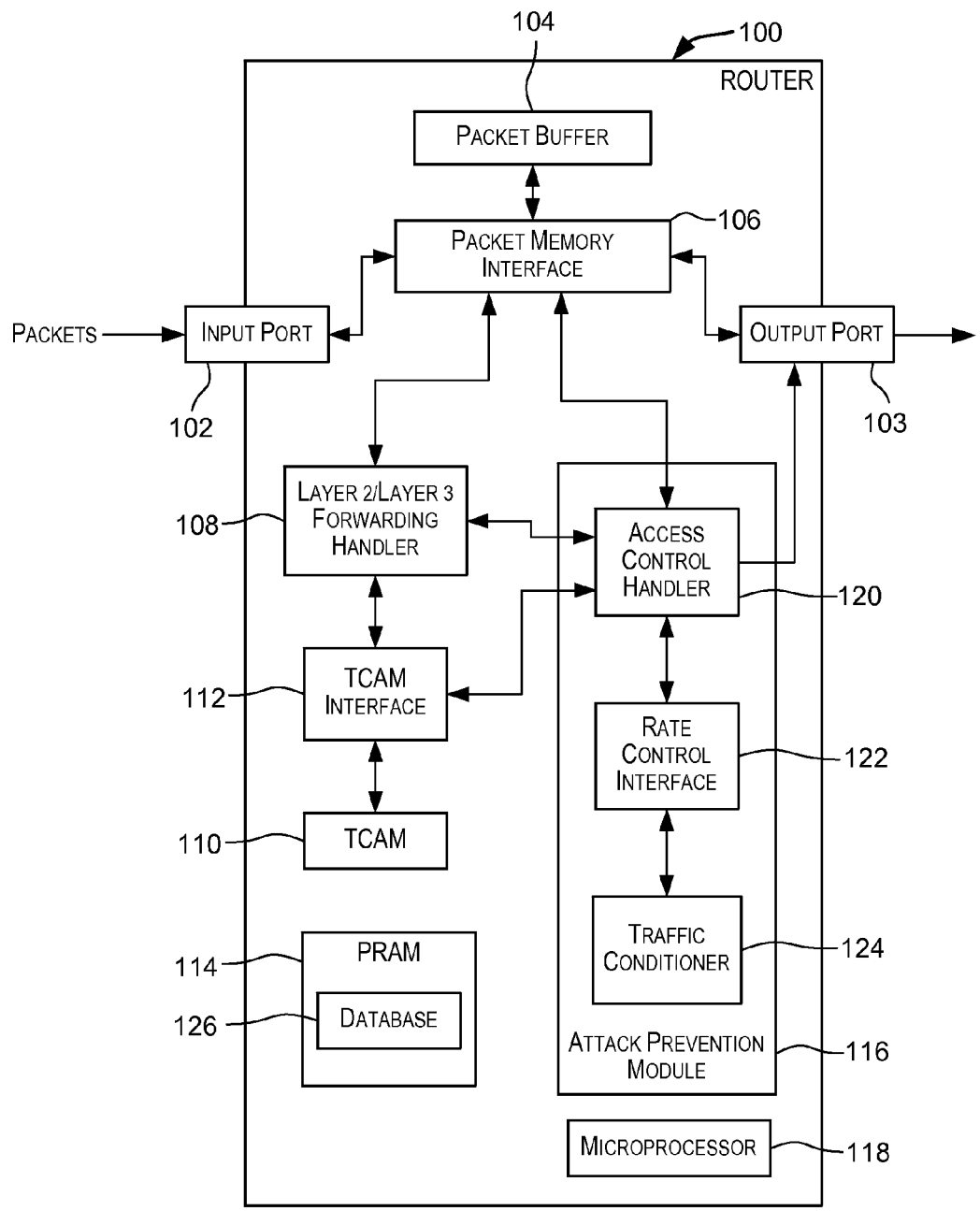
FIG. 1 is a simplified logical block diagram of a router that may incorporate an embodiment of the present invention.

FIG. 1 is a simplified logical block diagram of a router 100 that may incorporate an embodiment of the present invention. Router 100 depicted in FIG. 1 is merely illustrative of an embodiment incorporating the present invention and is not intended to limit the scope of the invention as recited in the claims. Embodiments of the present invention may be incorporated into various other systems and devices. One of ordinary skill in the art would recognize other variations, modifications, and alternatives.

As depicted in FIG. 1, router 100 comprises an input port 102, an output port 103, a packet buffer 104, a packet memory interface 106, a Layer 2/Layer 3 forwarding handler 108, a ternary content addressable memory (TCAM) 110, a TCAM interface 112, a PRAM 114, an attack prevention module 116, and a microprocessor 118.

Router 100 may receive various traffic flows via one or more input ports 102. A traffic flow comprises one or more packets that are received by router 100. The packets may be received from other systems or communication networks. Router 100 is configured to process the incoming packets, determine one or more output ports 103 for the packets, forward the packets to the determined output ports, and then communicate the packets from the router using the one or more output ports 103. In this manner, route 100 is configured to forward packets received by the router. Input port 102 and output port 103 may be two different physical ports or may be the same physical port of the router. A router may comprise one or more physical ports and may receive and forward multiple traffic flows concurrently.

Packet buffer 104 facilitates processing of packets received by router 100 by providing a repository for storing the received packets. Other data related to processing of packets may also be stored in packet buffer 104. Packet memory interface 106 is configured to regulate and facilitate access to information stored by packet buffer 104.

Layer 2/Layer 3 forwarding handler ("forwarding handler") 108 is configured to process the incoming packets, determine one or more output ports 103 for the packets, and forward the packets to the appropriate output ports. As part of the processing, for a packet received by router 100, forwarding handler 108 may parse and extract information from the packet and use the extracted information to determine an output port for the packet. For example, forwarding handler 108 may extract information from one or more headers (e.g., Layer 2 header, Layer 3 header) of a packet (which may be stored in packet buffer 104) to determine an output port 103 for the packet. Forwarding handler 108 may also process other network headers of a packet such as Layer 4 headers.

In one embodiment, forwarding handler 108 uses the information extracted from a packet to perform a lookup in content addressable memory (e.g., TCAM 110). A matching TCAM entry may provide additional information that may be used by forwarding handler 108 to forward the packet. For example, a matching TCAM entry may provide an index into a random access memory (e.g., PRAM 114) which stores additional information that is used for forwarding the packet. TCAM interface 112 is configured to regulate and facilitate lookups in TCAM 110.

Attack prevention module 116 is configured to perform processing for detecting and responding to attacks on router 100 including detecting and responding to DoS attacks. In one embodiment, attack prevention module 116 is configured to detect traffic flows received by router 100 that may be part of an attack such as a DoS attack on router 100. As part of this analysis, attack prevention module 116 is configured to detect and identify packets received by router 100 that may be part of a potential attack. Upon detecting potential attack packets, attack prevention module is configured to take appropriate action(s) to prevent the attack.

Attack prevention module 116 may comprise several modules. In the embodiment depicted in FIG. 1, attack prevention module 116 comprises an access control handler 120, a rate control interface 122, and a traffic conditioner 124. Attack prevention module 116 and its components may be implemented in hardware, software, or combinations thereof. In the embodiment depicted in FIG. 1, the components are implemented in hardware.

As stated above, attack prevention module 116 is configured to detect potential DoS attack packets and take preventive actions. In one embodiment, detection of attacks is facilitated using one or more access control lists (ACLs). An ACL is a list of one or more conditions or criteria. According to an embodiment of the present invention, an ACL comprises one or more conditions that are used to detect packets potentially involved in attacks including DoS attacks. The conditions specified by an ACL may include conditions identifying a source IP address, a destination IP address, a source port, a destination port, and the like. Various TCP flags may also be specified as ACL conditions. Matching on the TCP flags allows a user to examine packets across different source/destination combinations. The conditions for an ACL may be specific or generalized as desired. For example, an ACL may be defined to identify a specific traffic flow by identifying the source IP address, a destination IP address, a source port, and a destination port characterizing the traffic flow. The conditions for an ACL may be generalized such as only identifying a destination. Accordingly, any conditions may be specified in an ACL. ACLs are user-configurable and give a user considerable control in defining the various conditions to be used to detect packets involved in potential attacks.

In one embodiment, a packet is considered a potential DoS attack packet if it matches at least one ACL. A packet is considered to match an ACL if the set of one or more conditions specified by the ACL are matched or satisfied by the packet. Information extracted from the packet may be used to determine if the packet matches an ACL.

In the embodiment depicted in FIG. 1, the ACLs may be stored in TCAM 110. Forwarding handler 108 is configured to forward packets received by router 100 to access control handler 120 for performing processing related to attack detection and prevention. Access control handler 120 is configured to classify a packet as a potential attack packet if the packet matches an ACL stored in TCAM 110. For example, access control handler 120 is configured to classify a packet as a potential DoS attack packet if the packet matches an ACL specifying conditions for a potential DoS attack. In one embodiment, in order to determine if a packet matches an ACL and is thus a potential DoS attack packet, access control handler 120 is configured to parse and extract information from the packet and determine if the extracted information matches an ACL stored in TCAM 110. A packet is considered to match an ACL if the one or more conditions specified in the ACL are matched or satisfied by the packet. For example, if an ACL in TCAM 110 specifies conditions as "Source Address=XX, Destination Address=YY", then all packets received by router 100 that have a source address of XX and a destination address of YY are considered to match the particular ACL and are identified as potential DoS attack packets. A single packet may match multiple ACLs. In the embodiment depicted in FIG. 1, access control handler 120 may determine if a packet matches an ACL stored in TCAM 110 by performing TCAM lookups. Access control handler 120 may use the services of TCAM interface 112 to perform the TCAM lookups. A packet matches an ACL if a TCAM lookup for the packet results in a matched ACL.

Upon identifying a packet as a potential DoS attack packet due to the packet matching an ACL, attack prevention module 116 is configured to determine and initiate one or more actions to prevent the potential DoS attack. For a matched ACL, attack prevention module is configured to determine one or more actions associated with the matched ACL. In one embodiment, the matched ACL stored in TCAM 110 may itself identify the one or more actions to be performed. In an alternative embodiment, information that is used to determine the one or more actions to be performed when an ACL is matched may be stored in a database 126. In FIG. 1, database 126 is stored in PRAM 114. In this embodiment, a TCAM lookup resulting in a matched ACL provides an index to an entry in database 126 that comprises information that may be used to determine the one or more actions to be performed when the ACL is matched.

Various different actions may be performed for a matched ACL. These actions may condition the traffic flows received by router 100. These actions may include rate-limiting packets that match the ACL for a period of time, dropping packets that match the ACL for a period of time, sending packets that match the ACL to the microprocessor 118 for logging or further processing, and other actions. In some embodiments, no actions may be performed for a matched ACL.

In one embodiment, the performance of actions is facilitated by rate control interface 122 and traffic conditioner 124. If a packet is identified as a potential DoS attack packet due to an ACL match, access control handler 120 is configured to submit the packet to rate control interface 122 for further processing. Rate control interface 122 is configured to perform accounting for the packet and other packets that match the ACL and initiate one or more actions when appropriate. For example, if rate control interface 122 detects an anomaly based upon the packets accounting (e.g. if a particular rate threshold is exceeded), rate control interface 122 may cause traffic conditioner 124 to condition all packets that match the ACL. The traffic conditioning may include rate-limiting all packets that matched the ACL, dropping the matching packets for a period of time, and the like.

As described above, database 126 may store information associated with ACLs that is used to determine one or more actions to be performed when an ACL is matched by a packet received by router 100. In one embodiment, the information stored in database 126 for an ACL comprises configuration information and counters information. The configuration information for an ACL may include (1) an ACL identifier identifying the corresponding ACL; (2) a normal burst rate specifying a normal burst rate threshold value associated with the ACL; (3) a maximum burst rate specifying a maximum burst rate threshold value associated with the ACL; (4) a lock period value specifying a time value for a lockup period when the maximum burst rate is exceeded; (5) a rate limit period value specifying a time value for a rate limit period when the normal burst rate is exceeded; and (6) a logging enabled/disabled indicator indicating whether logging is to be enabled or disabled.

In one embodiment, the normal burst rate is defined as a bits-per-second value. For example, in one embodiment, the normal burst rate value may be set to a value between 1-100,000,000 bits-per-second. Other values may also be specified for the normal burst rate. In alternative embodiments, the normal burst rate may also be defined in terms of packets-per-second, or some other parameter.

The maximum burst rate may be defined as a number of packets per second value. In one embodiment, the value for the maximum burst rate is between 1-100,000 packets-per-second. Other values may also be specified for the maximum burst rate in alternative embodiments. In alternative embodiments, the maximum burst rate may also be defined in terms of bits-per-second, or some other parameter.

The lockup period is specified in terms of a time value such as second. In one embodiment, the value for the lockup period is from 1-10,000 seconds. Other values may be specified in alternative embodiments.

The counters information associated with an ACL comprises information related to one or more counters associated with the ACL. These counters are used for accounting purposes and may be used to determine when specific actions are to be performed when potential DoS attack packets are detected. In one embodiment, two counters are specified for each ACL—a drop counter and a forward counter. A drop counter is used to count packets that match the ACL and which are dropped due to a violation of the maximum burst rate specified for the ACL (i.e., when the maximum burst rate is exceeded). A forward counter is used to count packets that are forwarded (i.e., not dropped) while rate-limiting of matching packets is in effect for the ACL. Other counters may be used in alternative embodiments. For example, in one alternative embodiment, a "port block count" counter may be defined that counts the number of times a port is shut down for a particular traffic flow that matches an ACL. In alternative embodiments, counters may also be defined on a per traffic flow basis.

The information for an ACL, including configuration information and counters information, may be specified at different levels of granularity. For example, for a router such as router 100 depicted in FIG. 1, the information for an ACL may be specified on a per port basis. Accordingly, the information specified for and associated with an ACL for a first physical port of the router may be different from the information specified for the same ACL for a second physical port of the router.

In the embodiment depicted in FIG. 1 and described above, the various functions for preventing attacks such as matching of packets to ACLs, accounting of potential attack packets, and initiating and performing actions to prevent potential attacks are all performed in hardware. This enables the various functions to be performed in a fast and efficient manner. As a result, attack prevention, including DoS attack prevention, can be performed in a fast manner. Further, the processing is performed without using the local CPU 118 of the host system. As a result, the overall system performance of the host system (e.g., router 100 depicted in FIG. 1) is not degraded. This is useful for devices such as high capacity routers and switches that have to provide and support data forwarding are high line-rate speeds. Embodiments of the present invention enable such devices to perform attack prevention while maintaining the high forwarding rates. Examples of network devices that perform attack detection and prevention in the manner described above (and below) are routers and switches provided by Foundry Networks, Inc. of California.

In the embodiment described above, ACLs are used to specify conditions or criteria that are used to detect potential DoS attack packets. Various other ways may be used to specify the conditions for detecting attack packets in alternative embodiments.

Figure 2:
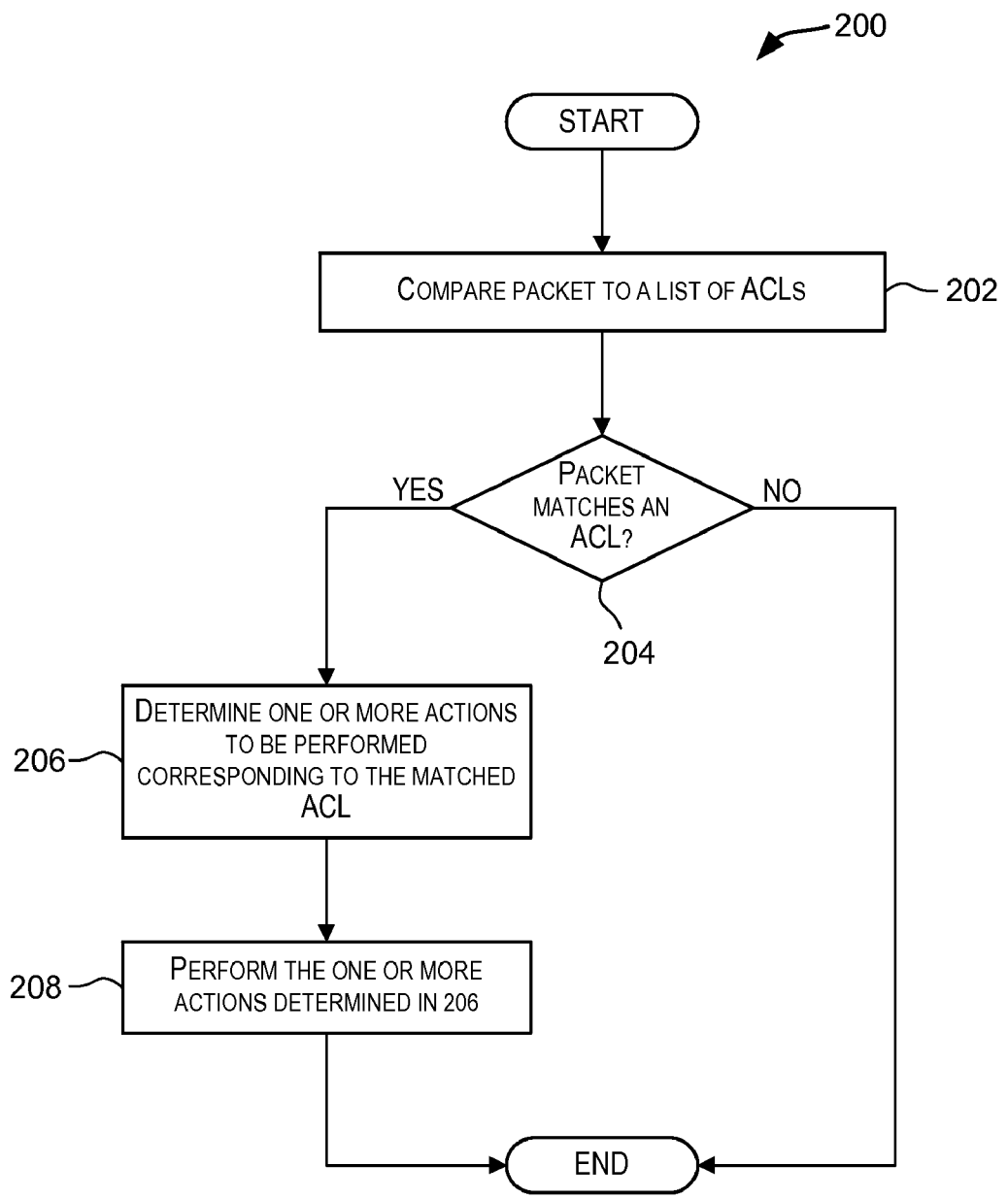
FIG. 2 is a simplified high-level flowchart depicting processing for detecting and responding to a DoS attack according to an embodiment of the present invention.

FIG. 2 is a simplified high-level flowchart 200 depicting processing for detecting and responding to a DoS attack according to an embodiment of the present invention. The processing depicted in FIG. 2 may be performed by software modules (code, instructions), hardware modules, or combinations thereof. The processing depicted in FIG. 2 comprises two stages. The first stage involves determining if an incoming packet is a potential DoS attack packet. If it is determined that a packet is a potential DoS packet, then during the second stage, actions are taken to respond to the potential DoS attack. The processing may be performed by a system such as router 100 depicted in FIG. 1. Flowchart 200 depicted in FIG. 2 merely illustrates an embodiment of the present invention and is not intended to limit the scope of the present invention. Other variations, modifications, and alternatives are also within the scope of the present invention. The processing depicted in FIG. 2 may also be applied to detect other types of attacks besides DoS attack packets.

As depicted in FIG. 2, in order to determine if a packet received by a system is a potential DoS attack packet, the packet is compared to a list of one or more ACLs (step 202). As part of 202, a list of ACLs specifying conditions related to DoS attacks (or other types of attacks) may be accessed. For each ACL in the list, it is determined if the packet matches or satisfies the one or more conditions specified by the ACL. In one embodiment, such as the embodiment depicted in FIG. 1, the ACLs may be stored in a CAM and comparisons may be performed in hardware by performing CAM lookups.

A determination is then made if the packet matches an ACL (step 204). The packet is considered as a potential DoS attack packet if it matches at least one ACL related to DoS attacks. If it is determined that the packet matches an ACL, then one or more actions corresponding to the matched ACL that are to be performed responsive to the potential DoS attack are determined (step 206). In the embodiment depicted in FIG. 1, a TCAM lookup that results in a match produces an index that is used to access an entry corresponding to the matched ACL stored in a RAM such as PRAM 114. The PRAM entry stores information that is used to determine the actions to be performed. The actions determined in 206 are then performed (step 208).

The processing depicted in FIG. 2 may be repeated for each packet received by a system such as router 100. In this manner, the attack prevention system is able to classify incoming traffic flows as potentially related to an attack on the system and can take appropriate preventive actions. In an alternative embodiment, the packets received by a system may be sampled and the processing depicted in FIG. 2 may be performed on only the sampled packets.

The actions that are performed in step 206 may vary from one embodiment to another. The actions may be application specific and are user-configurable. For example, in a network device such as router 100 depicted in FIG. 1 the actions may include dropping packets that match an ACL for a specified period of time, rate limiting a port over which the matching packets are received, performing logging functions, and the like. The ACLs and the information associated with the ACLs are user-configurable. Accordingly, a user may specify various different conditions for detecting potential attacks and also specify different actions to be performed to prevent such attacks.

Figure 3:
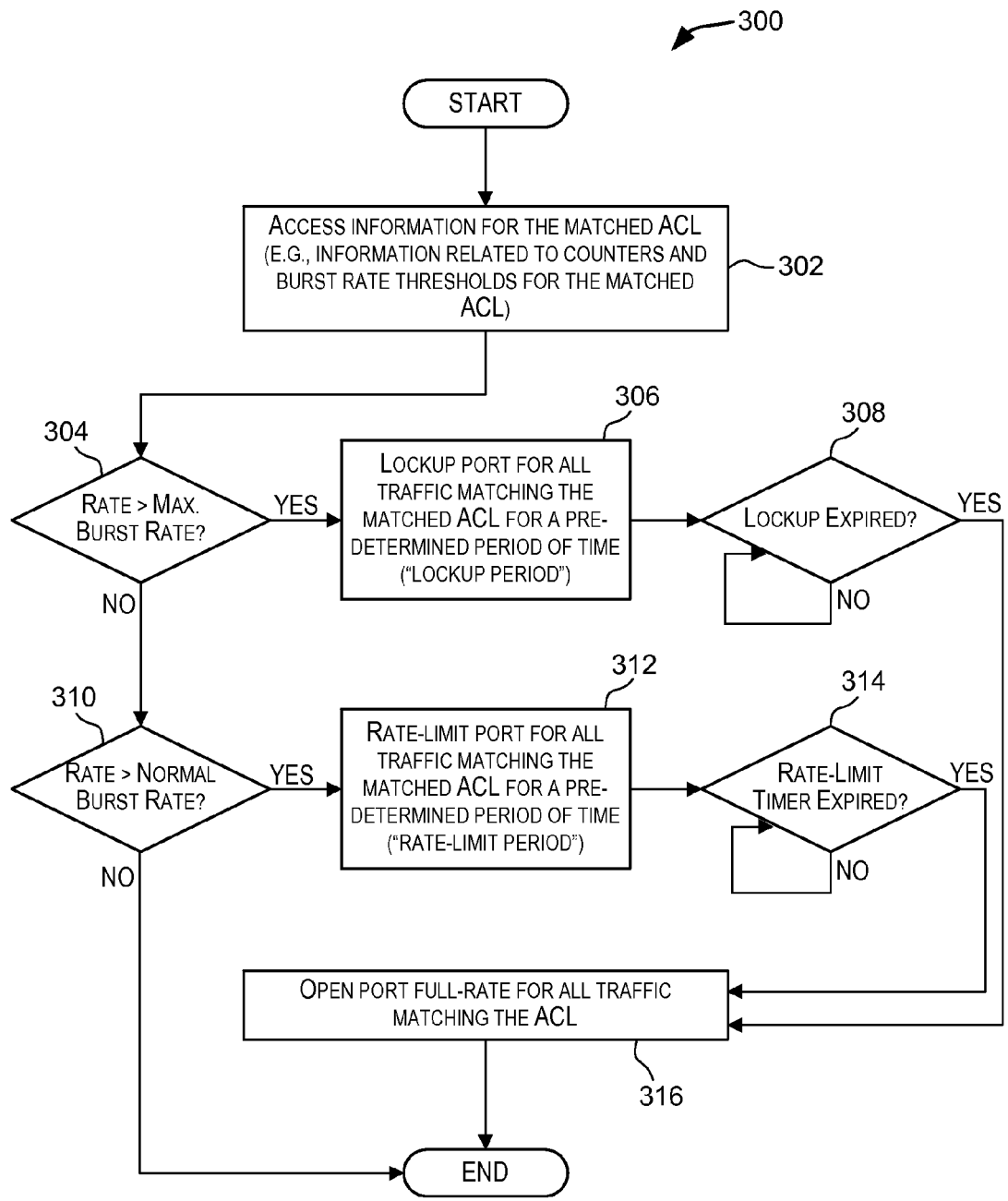
FIG. 3 is a simplified high-level flowchart depicting processing that may be performed when a packet is identified as a potential DoS packet according to an embodiment of the present invention.

FIG. 3 is a simplified high-level flowchart 300 depicting processing that may be performed when a packet is identified as a potential DoS packet according to an embodiment of the present invention. The processing depicted in FIG. 3 may be performed in a system (e.g., a switch or router) where packets are received via a port of the system. The processing may be performed by software modules (code, instructions), hardware modules, or combinations thereof. In one embodiment, the processing depicted in FIG. 3 is performed by rate control interface 122 and traffic conditioner 124 depicted in FIG. 1. Flowchart 300 depicted in FIG. 3 is merely illustrative of an embodiment of the present invention and is not intended to limit the scope of the present invention. Other variations, modifications, and alternatives are also within the scope of the present invention.

The processing depicted in FIG. 3 assumes a system that receives one or more traffic flows via a port of the system. The port is initially set to allow full rate transmission of all types of packets. The processing further assumes that a traffic flow received via the port has been determined to match a particular ACL (i.e., at least one packet received via the port has been determined to match a particular ACL). As depicted in FIG. 3, after determining that a packet matches an ACL, information related to the matched ACL is accessed (step 302). The information accessed in 302 may include information related to one or more counters associated with the ACL and burst rate thresholds associated with the matched ACL. In one embodiment, the information associated with the ACL may be read from hardware such as from a RAM. The information for the matched ACL may be specified on a per port basis. In such systems, the information corresponding to the port over which the matching packet was received and corresponding to the matched ACL is accessed.

In some embodiments, such as the embodiment depicted in FIG. 1, the information may be accessed upon performing a TCAM lookup that results in a match. A matching ACL entry in the TCAM may yield an index that is used to access information related to the matching ACL from a database stored in memory such as in a PRAM. The database entry may provide information related to counters and burst rate thresholds for the matched ACL.

The counters associated with the matched ACL may include a drop counter and a forward counter. As previously described, a drop counter is used to count packets that match the ACL and which are dropped due to a violation (exceeding) of the maximum burst rate specified for the ACL. A forward counter is used to count packets that are forwarded while rate-limiting of matching packets is in effect for the ACL for a particular port. The burst rate thresholds accessed in 302 may include a normal burst rate and a maximum burst rate associated with the ACL.

A determination is then made if the present rate at which packets matching the matched ACL are received is greater than the maximum burst rate associated with the matched ACL (step 304). If the rate at which packets matching the matched ACL are received is determined to be higher than the maximum burst rate, then the port is locked up for all traffic matching the matched ACL for a predetermined period of time (step 306). The period of time for which the port is to be locked up for packets matching the matched ACL may be specified by the "lockup period" value associated with the matched ACL and accessed in 302. A timer may be initiated to lock up the port for a specific period of time (step 308). As part of the lockup, all packets that match the matched ACL are dropped. As a result, the dropped packets are not forwarded and thereby prevented from entering a protected network segment. In one embodiment, for example, in a system such as a router or switch, dropping a packet means that the packet is not forwarded by the router or switch even though the packet could be forwarded. All resources associated with the processing of the dropped packet (such as memory buffers) are freed so that they can be reused to process other packets. Once it is determined that the lockup period has expired, then the port is again opened up at full rate for traffic matching the matched ACL.

As part of 306 and 308, accounting may be performed to count the number of packets that are dropped during the lockup period. The drop counter associated with the ACL may be used to keep count of the dropped packets.

A determination is then made if the normal burst rate associated with the matched ACL is violated (step 310). As previously described, the normal burst rate is usually defined as bits-per-second. Accordingly, in 310, a determination is made if the bits-per-second at which packets matching the matched ACL are received is higher than the normal burst rate. If the present bits-per-second rate of the matching traffic flow is determined to be higher than the normal burst rate, then the port is rate-limited for all traffic matching the matched ACL for a predetermined period of time (step 312). The period of time for which the port is rate-limited for packets matching the matched ACL may be specified by the "rate-limit period" value associated with the matched ACL. A timer may be initiated to count down the rate-limit period for the port (step 314). As part of rate-limiting the port for the matching traffic, only certain number of packets that are received via the port and that match the matched ACL are allowed to pass through, the excess packets are dropped.

For purposes of rate limiting, a rate limit or rate threshold value may be defined by a user. Excess packets are those packets that match the ACL and that are received over the rate threshold value. The rate threshold value may be configured in terms of bits-per-second or packets-per-second or some other rate parameter. Using a rate threshold defined in terms of packets-per-second as an example, the packets-per-second rate of the packets that match the ACL is measured or tracked. When a packet that matches the ACL is received, a check is made (using the forward counter) to see if forwarding the packet will result in the configured rate threshold (configured as packets-per-second) being exceeded. If it is determined that the rate threshold will be exceeded then the packet is dropped. For example, assuming that the user-configured rate threshold value is set to 1000 packets/sec. At time zero (0), counting of packets that are received and that match the ACL and that are forwarded is started. If at time 0.95 (not a second yet), a packet #1001 is received, then this packet is identified as an excess packet (since it exceeds the 1000 packets/sec limit) and is dropped. Counting is restarted for the next second. Accordingly, if packet #1001 were to be received at 1.01 seconds, then it would be forwarded and not dropped. In this manner, packets that exceed the rate limit threshold are dropped. Any packet received via the input port that matches the ACL and where receipt of the packet causes a rate threshold value to be exceeded is dropped.

Rate limiting prevents the system that receives packets from being overwhelmed with packets that are potentially part of an attack on the system. In a router or switch embodiment, as a result of rate-limiting a port for packets that match an ACL, only a certain number of the packets that match the ACL packets are forwarded by the router or switch, the excess packets are dropped. Once it is determined that the rate-limit period has expired, the port is opened up at full rate for traffic matching the matched ACL.

As part of 312 and 314, accounting may also be performed to count the number of packets that are forwarded or not dropped as a result of the rate-limiting. The forward counter associated with the ACL keeps count of the forwarded packets.

In the manner described above, in response to a traffic flow that is detected as potentially part of a DoS attack, the port over which the traffic flow is received is either rate limited or locked-up for a pre-determined period of time for the matching traffic flow. Other traffic that does not match any ACL is however allowed to pass through unhindered. As a result, while the port is locked-up or rate-limited for a certain type of traffic that matches an ACL, it is kept open for other types of traffic flows that are not identified as potential attacks.

In the embodiment described above, techniques are described for detecting and responding to DoS attacks. However, the teachings of the present invention are however not limited to detecting and responding to DoS attacks. Embodiments of the present invention may also be used to detect and respond to other types of attacks on computers and networks. An attack is detected by comparing packets to a list of conditions such as conditions specified in ACLs. If a packet matches a particular ACL, then that packet is identified as a potential packet involved in an attack on the computer or network. Appropriate actions may then be taken responsive to the detection to prevent the attack.

ACL-based attack prevention techniques, as described above, provide great flexibility on what packets can be rate-limited and/or dropped. A user may configure various matching conditions to detect and regulate traffic flows that the user wants to tag as potential attacks. The user may also specify different actions to be performed. The following section describes examples in which embodiments of the present invention may be used to prevent two common types of DoS attacks.

EXAMPLE #1

Detecting and Preventing a Smurf Attack

A device (such as a device provided by Foundry Networks, Inc. of Santa Clara, Calif.) may be configured to drop ICMP echo-reply packets when excessive numbers of the packets are encountered, as is the case when the device is the victim of a Smurf attack. An ACL may be configured that may be used to detect ICMP echo-reply packets. The burst rate thresholds may be configured for the device such that the packets are dropped when the thresholds are violated. The number of incoming packets that match the ACL are counted and compared to the burst rate thresholds. If the total volume (in terms of bits-per-second) of the packets that match the ACL exceeds the normal burst rate, then the excess packets are dropped, thereby rate-limiting the matching packets. If the number of packets that match the ACL exceeds the maximum burst rate, then all packets that match the ACL are dropped for the number of seconds specified by the lockup period parameter. When the lockup period expires, the counters are reset.

For example, the normal burst rate may be set to 5,000,000 bits-per-second, the maximum burst rate may be set to 1000 packets-per-second, the lockup period may be set to 300 seconds, and the rate-limit period may be set to 200 seconds. Given these parameters, if the total traffic volume (in bits-per-second) of ICMP echo-reply packets received exceeds 5,000,000 bits-per-second, then the excess ICMP echo-reply packets are dropped for the next 200 seconds, thereby rate-limiting the matching packets. If the number of ICMP echo-reply packets received per second exceeds 1,000 packets, then the device drops all ICMP echo-reply packets for the next 300 seconds.

EXAMPLE #2

Detecting and Preventing TCP SYN Attacks

TCP SYN attacks exploit the process of how TCP connections are established in order to disrupt normal traffic flow. When a TCP connection starts, the connecting host first sends a TCP SYN packet to the destination host. The destination host responds with a SYN ACK packet, and the connecting host sends back an ACK packet. This process, known as a "TCP three-way handshake", establishes the TCP connection.

While waiting for the connecting host to send an ACK packet, the destination host keeps track of the as-yet incomplete TCP connection in a connection queue. When the ACK packet is received, information from the connection is removed from the connection queue. Usually there is not much time between the destination host sending a SYN ACK packet and the source host sending an ACK packet, so the connection queue clears quickly.

In a TCP SYN attack, an attacker floods a host with TCP SYN packets that have random source IP addresses. For each of these TCP SYN packets, the destination host responds with a SYN ACK packet and adds the information to the connection queue. However, since the source host does not exist, no ACK packet is sent back to the destination host, and an entry remains in the connection queue until it ages out (typically after around a minute). If the attacker sends enough TCP SYN packets, then connection queue of the destination host can fill up, and service can be denied to legitimate TCP connections.

To protect against TCP SYN attacks, a device (such as a device provided by Foundry Networks, Inc. of Santa Clara, Calif.) may be configured to detect TCP SYN packets when excessive numbers are encountered. An ACL may be configured to detect TCP SYN packets. Threshold values may be set that are targeted for the device itself or for packets passing through from one interface to another such that the packets are dropped when the thresholds are exceeded. The number of incoming packets that match the ACL are counted and compared to the burst rate thresholds. If the total volume (in terms of bits-per-second) of the packets that match the ACL exceeds the normal burst rate, then the excess packets are dropped, thereby rate-limiting the matching packets. If the number of packets that match the ACL exceeds the maximum burst rate, then all packets that match the ACL are dropped for the number of seconds specified by the lockup period parameter. When the lockup period expires, the counters are reset.

For example, the normal burst rate may be set to 5,000,000 bits-per-second, the maximum burst rate may be set to 1,000 packets-per-second, the lockup period may be set to 300 seconds, and the rate-limit period may be set to 200 seconds. Given these parameters, if the total traffic volume (in bits-per-second) of TCP SYN packets received exceeds 5,000,000 bits-per-second, then the excess TCP SYN packets are dropped for the next 200 seconds, thereby rate-limiting the matching packets. If the number of TCP SYN packets received per second exceeds 1,000 packets, then the device drops all TCP SYN packets for the next 300 seconds.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method comprising:
   storing a set of access control lists in a content addressable memory (CAM), each access control list specifying one or more conditions;
   performing one or more lookups in the CAM to identify a packet that causes a first access control list from the set of access control lists to be matched;

determining a first threshold and a second threshold associated with the first access control list, the first threshold indicating a first data rate and the second threshold indicating a second data rate;

determining a first time period and a second time period associated with the first access control list;

determining if receipt of the packet causes the first threshold to be exceeded;

upon determining that receipt of the packet causes the first threshold to be exceeded, dropping the packet and all subsequently received packets that cause the first access control list to be matched for the first period of time;

determining if receipt of the packet causes the second threshold to be exceeded but does not cause the first threshold to be exceeded; and upon determining that receipt of the packet causes the second threshold to be exceeded but does not cause the first threshold to be exceeded, dropping the packet and, for the second period of time, dropping any subsequently received packet that causes the first access control list to be matched.

2. The method of claim 1 further comprising counting a number of dropped packets.

3. The method of claim 1 wherein determining the first threshold and the second threshold associated with the first access control list comprises:

accessing an entry in a database using the first access control list; and determining the first threshold and the second threshold from the entry in the database.

4. The method of claim 1 wherein the CAM is a ternary CAM.

5. The method of claim 1 wherein the first access control list specifies one or more conditions for detecting a packet involved in a denial-of-service attack.

6. A method comprising:

determining a first threshold and a second threshold associated with a first access control list, the first threshold indicating a first data rate and the second threshold indicating a second data rate;

determining a first time period and a second time period associated with the first access control list;

determining if receipt of a packet, which causes the first access control list to be matched, causes the first threshold to be exceeded;

dropping the packet and all subsequently received packets that cause the first access control list to be matched for the first period of time upon determining that receipt of the packet causes the first threshold to be exceeded;

determining if receipt of the packet causes the second threshold to be exceeded but does not cause the first threshold to be exceeded; and upon determining that receipt of the packet causes the second threshold to be exceeded but does not cause the first threshold to be exceeded, dropping the packet and, for the second period of time, dropping any subsequently received packet that causes the first access control list to be matched.

7. A system comprising:

a content addressable memory (CAM) adapted to store a set of access control lists, each access control list specifying one or more conditions; and an attack prevention module adapted to:

perform one or more lookups in the CAM to identify a packet that causes a first access control list from the set of access control lists to be matched;

determine a first threshold and a second threshold associated with the first access control list, the first threshold indicating a first data rate and the second threshold indicating a second data rate;

determine a first time period and a second time period associated with the first access control list;

determine if receipt of the packet causes the first threshold to be exceeded;

cause the packet and all subsequently received packets that cause the first access control list to be matched to be dropped for the first period of time upon determining that receipt of the packet causes the first threshold to be exceeded;

determine if receipt of the packet causes the second threshold to be exceeded but does not cause the first threshold to be exceeded, and upon determining that receipt of the packet causes the second threshold to be exceeded but does not cause the first threshold to be exceeded, cause the packet to be dropped and, for the second period of time, cause any subsequently received packet that causes the first access control list to be matched to be dropped.

8. The system of claim 7 wherein the attack prevention module is adapted to count a number of dropped packets.

9. The system of claim 7 wherein the attack prevention module is adapted to:

access an entry in a database using the first access control list; and determine the first threshold and the second threshold from the entry in the database.

10. The system of claim 7 wherein the CAM is a ternary CAM.

11. The system of claim 7 wherein the first access control list specifies one or more conditions for detecting a packet involved in a denial-of-service attack.

12. A system comprising:

a memory configured to store a first access control list; and a module configured to:

determine a first threshold and a second threshold associated with the first access control list, the first threshold indicating a first data rate and the second threshold indicating a second data rate;

determine a first time period and a second time period associated with the first access control list;

determine if receipt of a packet, which causes the first access control list to be matched, causes the first threshold to be exceeded;

cause the packet and all subsequently received packets that cause the first access control list to be matched to be dropped for the first period of time upon determining that receipt of the packet causes the first threshold to be exceeded;

determine if receipt of the packet causes the second threshold to be exceeded but does not cause the first threshold to be exceeded; and upon determining that receipt of the packet causes the second threshold to be exceeded but does not cause the first threshold to be exceeded, cause the packet to be dropped and, for the second period of time, cause any subsequently received packet that causes the first access control list to be matched to be dropped.

* * * * *